US012386795B2

(12) United States Patent
Dube et al.

(10) Patent No.: US 12,386,795 B2
(45) Date of Patent: Aug. 12, 2025

(54) EXTRACTING USER INTERACTIONS TO GENERATE BATCHES FOR MIGRATION BETWEEN TENANTS

(71) Applicant: Microsoft Technology Licensing, LLC, Redmond, WA (US)

(72) Inventors: Anshul Dube, Bothell, WA (US); Brian Alan Day, Lakeville, MA (US); Kimberly Gail Del Rosario Cabamalan, Seattle, WA (US); Connor David Copus, Grand Rapids, MI (US); Vipul Agarwal, Bellevue, WA (US); Seyed Mohammad Kiaei, Bellevue, WA (US); Billy Goethetaro Norcilien, Snellville, GA (US); Ankita Mishra, Renton, WA (US); Andrew Burke Ryan, Seattle, WA (US); Jeff Todd Kizner, Redmond, WA (US); Shankaranand Arunachalam, Redmond, WA (US); Virat Satyam Mishra, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/403,187

(22) Filed: Jan. 3, 2024

(65) Prior Publication Data

US 2025/0217330 A1    Jul. 3, 2025

(51) Int. Cl.
*G06F 16/21*    (2019.01)
*G06F 16/23*    (2019.01)
*G06F 16/25*    (2019.01)

(52) U.S. Cl.
CPC ........ *G06F 16/214* (2019.01); *G06F 16/2386* (2019.01); *G06F 16/256* (2019.01)

(58) Field of Classification Search
CPC ... G06F 16/214; G06F 16/2386; G06F 16/256
See application file for complete search history.

(56) References Cited

U.S. PATENT DOCUMENTS

| 11,467,866 B2* | 10/2022 | Liu ..................... G06F 11/3442 |
| 2017/0006135 A1* | 1/2017 | Siebel ..................... H04L 69/40 |
| 2019/0340251 A1* | 11/2019 | Peddada ................... H04L 9/16 |
| 2021/0256644 A1* | 8/2021 | Cahalane ........... G06Q 10/1053 |

(Continued)

OTHER PUBLICATIONS

"Cdlib Algorithms Leiden", Retrieved From: https://cdlib.readthedocs.io/en/latest/reference/cd_algorithms/algs/cdlib.algorithms.leiden.html, Retrieved on: Aug. 28, 2023, 2 Pages.

(Continued)

*Primary Examiner* — Angelica Ruiz
(74) *Attorney, Agent, or Firm* — Ray Quinney & Nebeker P.C.; Paul N. Taylor (57) ABSTRACT

A batching system accesses user interaction data to identify relationships between users and between users and resources. The relationships are weighted and users are grouped for migration based upon the weighted relationships. The groups are displayed for administrator interaction and are provided to a migration system for migration of the users between two tenants. This enhances migration efficiency and accuracy and makes migration much less disruptive to the end users.

20 Claims, 7 Drawing Sheets

(56) References Cited

U.S. PATENT DOCUMENTS

| | | | | |
|---|---|---|---|---|
| 2023/0267015 A1* | 8/2023 | Tong | ............. | G06F 9/4881 718/104 |
| 2024/0152869 A1* | 5/2024 | Bandel | ............. | G06N 5/01 |
| 2024/0362047 A1* | 10/2024 | Spain | ............. | H04L 41/0806 |

OTHER PUBLICATIONS

"Cdlib Algorithms Louvain", Retrieved From: https://cdlib.readthedocs.io/en/latest/reference/cd_algorithms/algs/cdlib.algorithms.louvain.html, Retrieved on: Aug. 28, 2023, 2 Pages.

"Cdlib Algorithms Spectral", Retrieved From: https:/cdlib.readthedocs.io/en/latest/reference/cd_algorithms/algs/cdlib.algorithms.spectral.html, Retrieved on: Aug. 28, 2023, 2 Pages.

"Cdlib Algorithms Walkscan", Retrieved From: https://cdlib.readthedocs.io/en/latest/reference/cd_algorithms/algs/cdlib.algorithms.walkscan.html, Retrieved on: Aug. 28, 2023, 1 Page.

"Cdlib Algorithms Walktrap", Retrieved From: https://cdlib.readthedocs.io/en/latest/reference/cd_algorithms/algs/cdlib.algorithms.walktrap.html, Retrieved on; Aug. 28, 2023, 1 Page.

"Cdlib Evaluation Avg_Distance", Retrieved From: https://cdlib.readthedocs.io/en/latest/reference/eval/cdlib.evaluation.avg_distance.html#cdlib.evaluation.avg_distance, Retrieved on: Aug. 28, 2023, 1 Page.

"Cdlib Evaluation Link Modularity", Retrieved From: https://cdlib.readthedocs.io/en/latest/reference/eval/cdlib.evaluation.link_modularity.html#cdlib.evaluation.link_modularity, Retrieved on: Aug. 28, 2023, 1 Page.

"Evaluation and Benchmarking", Retrieved From: https://cdlib.readthedocs.io/en/latest/reference/evaluation.html. Retrieved on: Aug. 28, 2023, 4 Pages.

\* cited by examiner

EXTRACTING USER INTERACTIONS TO GENERATE BATCHES FOR MIGRATION BETWEEN TENANTS

BACKGROUND

Computer systems are currently in wide use. Many computing systems host services for tenants. Tenants may be organizations that have users. Therefore, the services are set up with a tenant computing system for each tenant. Users of a tenant may use the tenant computing system to interact with one another, such as using electronic mail, chat services, attending meetings, etc. Also, users of a particular tenant have accounts, identities, and other data in the tenant computing system and store user data at the tenant computing system. Users can also access shared resources at the tenant computing system.

It is not uncommon for large groups of users of a tenant computing system to stop working for the tenant and begin working for a second tenant. Such scenarios may occur, during mergers of organizations, acquisitions of organizations, etc. In such scenarios, all of the users, who are to be migrated must have their accounts, data, identities, and other information migrated from the first tenant computing system to the second tenant computing system. Thus, a migration operation may involve migrating hundreds or thousands of users from one tenant computing system to another tenant computing system.

The discussion above is merely provided for general background information and is not intended to be used as an aid in determining the scope of the claimed subject matter.

SUMMARY

A batching system accesses user interaction data to identify relationships between users and between users and resources. The relationships are weighted and users are grouped for migration based upon the weighted relationships. The groups are displayed for administrator interaction and are provided to a migration system for migration of the users between two tenants. This enhances migration efficiency and accuracy and makes migration much less disruptive to the end users.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, there are many scenarios (such as mergers, acquisitions, etc.) where users are migrated from one tenant computing system to another tenant computing system. Such migration projects often take months to complete, and the users are migrated from one tenant to the other tenant in batches. Normally, the administrative users performing the migrations are not fully aware of the day-to-day working relationships of the users that are being migrated. Therefore, even users that work closely with one another in day-to-day operations may be split into different batches so that they are migrated at different times. In such cases, the users that have already been migrated to the new tenant must switch between identities that belong to the different tenants in order to access applications and collaborate with users that are not yet migrated.

Therefore, the present description describes a system that automatically uses user-to-user interaction data and user-to-resource interaction data to identify relationships between users who are being migrated and other users who are being migrated as well as between users who are being migrated and shared resources that are being migrated. The present system also automatically identifies a strength of those relationships based upon a variety of different strength criteria. The strengths of the relationships are used to automatically generate groups of users and groups of resources (referred to herein as batches). The batches can be presented for validation by an administrator or for automatic validation and, once validated, are provided to a migration system so that users and resources can be migrated based upon the batches. By automatically it is meant, for example, that the operation is performed without further human involvement except, perhaps, to authorize or initiate the operation.

The present description thus describes a system that facilitates more efficient data transfer. As mentioned, cross-tenant migration involves moving data, settings, and user accounts from one environment to another. Discovering users that are to be transferred ensures that no data or user accounts are left behind during the migration process. Thus, the accuracy of the migration process is increased. Further, discovering users in this way helps to more accurately map data to the corresponding users, while maintaining data integrity. The accurate identification of users and accounts also ensures that sensitive data is not exposed to unauthorized users during migration, thus enhancing security and compliance during the migration operation. The present description also enhances the efficiency of resource allocation. Knowing which accounts or users need to be migrated allows resources to be allocated in a way that avoids wasted effort on non-essential accounts, and instead enables resources to be focused on critical users and data. The accurate discovery of users for migration also reduces the overall cost of migration by avoiding paying for unnecessary storage, licenses, or migration services for users that don't need to be moved. The present system also reduces the down time associated with the migration process, thus improving the user experience.

Figure 1:
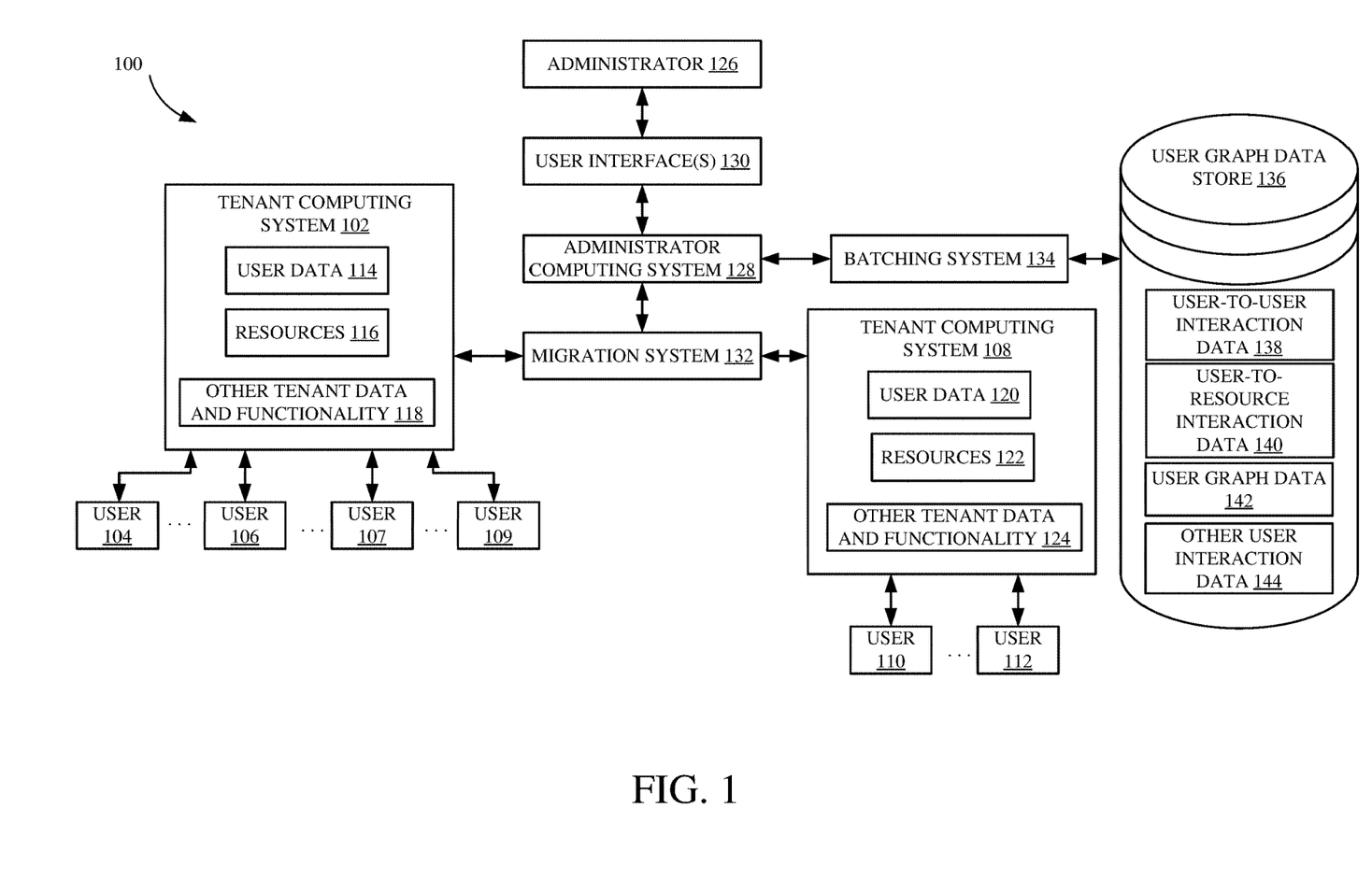
FIG. 1 is a block diagram of one example of a computing system architecture.

FIG. 1 is a block diagram of one example of a computing system architecture 100. A first tenant computing system 102 has a plurality of users 104-106, and 107-109 and a second tenant computing system 108 has a plurality of users 110-112. Tenant computing system 102 can include user data 114, resources 116, and any of a wide variety of other tenant data and functionality 118. Tenant computing system 108 can also include user data 120, resources 122, and any of a wide variety of other tenant data and functionality 124. The user data 114, 120 can be user identity data which identifies each of the users, user account data which defines an account for each user, mailboxes, and any of a wide variety of other data. Resources 116, 122 can include shared resources, such as shared document storage and collaboration sites, shared calendars, or any of a wide variety of other shared resources.

In one example, and for any of a wide variety of different reasons (such as a merger, acquisition, etc.) a plurality of the users (e.g., 104-106) of tenant computing system 102 must be migrated to tenant computing system 108. Therefore, the user data, accounts, resources, and other tenant data and functionality corresponding to the users to be migrated must also be migrated from tenant computing system 102 to tenant computing system 108.

In order to accommodate the migration of users, an administrator 126 interacts with an administrator computing system 128 through user interfaces 130 in order to control and manipulate a migration system 132. Migration system 132 is used to migrate user data 114, resources 116, and any of a wide variety of other tenant data and functionality 118 corresponding users 104-106 of tenant computing system 102 that are to be migrated to tenant computing system 108. Assume, for the sake of discussion, that users 104-106 may include tens, hundreds, or thousands of users who are to be migrated from tenant computing system 102 to tenant computing system 108. In that case, administrator 126 first needs to identify all of the identities of users 104-106 that are to be migrated and then identify their corresponding user data 114, resources 116, and any other tenant data or functionality 118 that is to be migrated as well.

In some current systems, and as discussed above, administrator 126 attempts to divide the users 104-106 into groups or batches and migrate the users, one batch at a time. This tends to make the migration task more manageable and less disruptive. However, as also discussed above, administrator 126 would normally group the users in ways where users that worked regularly with one another during daily operation were divided into different groups or batches. Thus, in order to continue working during the time when one of the users was migrated and the other was not, the user who was migrated would need to interact with both tenant computing systems 102 and 108. This would not only take more network bandwidth, because the user would need to communicate with both tenant computing systems, but it would significantly degrade the user experience.

Therefore, in accordance with one example, the computing system architecture 100 includes batching system 134. Batching system 134 accesses user interaction data in user graph data store 136. The user interaction data can include user-to-user interaction data 138, user-to-resource interaction data 140, user graph data 142, and/or other user interaction data 144. The user-to-user interaction data 138 includes data records that identify when different users of tenant computing system 102 interact with one another. For instance, user-to-user interaction data 138 can include records showing email exchanges between the users, chat message exchanges, meeting data where users were common invitees or attendees of different meetings, user collaboration data indicating that different users collaborated together on a common document or project, or any of a wide variety of other interaction data indicating that users of tenant computing system 102 interacted with one another in the same way.

The user-to-user interaction data 138 can also identify actions taken by the different users during the interactions. For instance, the action data may indicate not only that a particular user sent an email message to another user, but also the action taken by the other user in response to receiving the email message. By way of example, the action data may indicate that the other user deleted the email message without reading it, read the email message, replied to the email message, etc. Similarly, if the user-to-user interaction data 138 identifies that two users were invited to a common meeting, the action data may identify whether the users attended the meeting, whether the users deleted the meeting request or forwarded the meeting request, etc. The user-to-user interaction data 138 may also include such things as frequency information indicating how frequently the users interacted with one another, and recency data indicating how recently the users interacted with one another. The user-to-user interaction data 138 can include a variety of any other types of data as well.

User-to-resource interaction data 140 contains data records indicating how the users of tenant computing system 102 interacted with resources 116, such as shared data repository sites, shared data collaboration resources, and/or other resources. User-to-resource interaction data 140 can also include frequency data indicating how frequently each user interacted with a resource, recency data indicating how recently the user interactions have been, and/or any of a wide variety of interaction data.

User graph data 142 may be pre-computed or dynamically computed data that identifies relationships between different users. For instance, the user graph data 142 may include users and resources as nodes in the graph and relationships between those users and resources as edges in the graph. The relationships may be established based upon user-to-user interactions and user-to-resource interactions. For instance, when user 104 sends an email message to user 106, this may cause the nodes representing users 104 and 106 to be joined by an edge indicating that at least some form of relationship exists between those two users. Also, in one example, the user graph data 142 can be computed dynamically so that the edges are weighted based upon the frequency, recency, and quality of the interactions. Weighting the edges in the user graph is described in greater detail below. Where the weights and graph edges are not computed, then batching system 134 can compute the edges or relationships between the different users, as well as the weights corresponding to those relationships.

Figure 2:
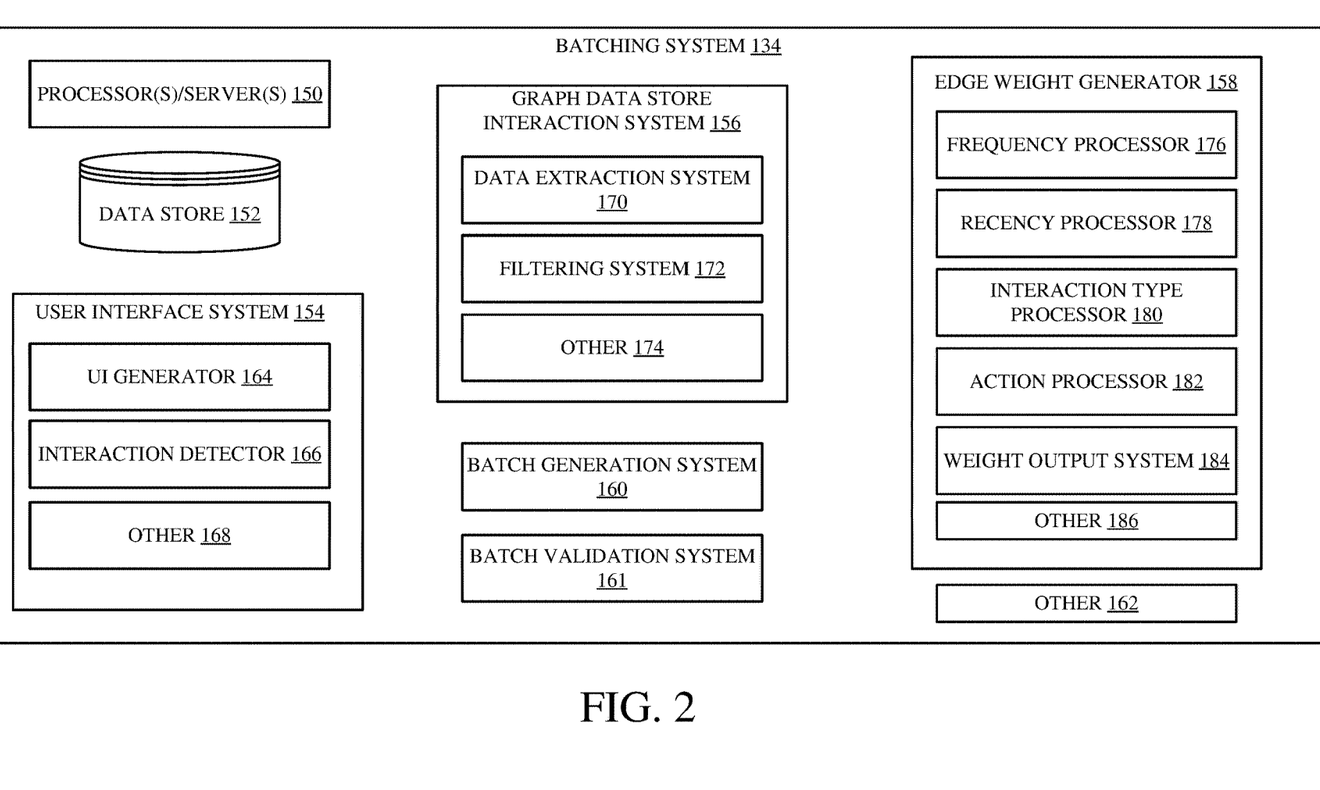
FIG. 2 is a block diagram showing one example of a batching system in more detail.

FIG. 2 is a block diagram of one example showing batching system 134 in more detail. In the example shown in FIG. 2, batching system 134 includes processors or servers 150, data store 152, user interface system 154, graph data store interaction system 156, edge weight generator 158, batch generation system 160, batch validation system 161, and other items 162. User interface system 154, itself, includes user interface (UI) generator 164, interaction detector 166, and other items 168. Data graph store interaction system 156 includes data extraction system 170, filtering system 172, and other items 174. Edge weight generator 158 includes frequency processor 176, recency processor 178, interaction type processor 180, action processor 182, weight output system 184, and other items 186. Before describing the overall operation of batching system 134 in more detail, a description of some of the items in batching system 134, and their operation, will first be provided.

UI generator 164 generates a representation of a user interface that can be provided through administrator computing system 128 as a user interface 130 for interaction by administrator 126. Some examples of user interfaces are described in greater detail below with respect to FIGS. 4A-4B. Interaction detector 166 detects administrator interaction with those user interfaces to manipulate administrator computing system 128 and some portions of batching system 134. For instance, administrator 126 can provide inputs through user interface 130 to define the particular users 104-106 that are to be migrated from tenant computing system 102 to tenant computing system 108, the desired batch sizes, filter data, etc.

Graph data store interaction system 156 then interacts with the data in user graph data store 136. Data extraction system 170 extracts the user interaction data corresponding to the users 104-106 that are to be migrated. In one example, in extracting the data for users 104-106, extraction system 170 may use filtering system 172 to apply filters configured by administrator 126 to filter out the interaction data corresponding to users that are not to be migrated. Therefore, filtering system 172 generates a set of users and resources that are to be migrated.

Where the relationships or edges between the nodes (which represent users and resources) in the user interaction data have not yet been weighted, then edge weight generator 158 generates weights for the relationships or edges. Frequency processor 176 analyzes the frequency of the interactions (such as the frequency of emails, chat messages, etc., between users, the frequency of user interaction with resources, the frequency of meeting attendance, etc.) and generates a metric indicative of the frequency. Recency processor 178 identifies a recency metric indicating how recently the interactions have taken place. The metrics may be rolling averages or other aggregations or metrics.

Interaction type processor 180 generates a metric based on the types of interactions. For instance, multiple chat message interactions may be weighted higher than multiple email message interactions or vice versa. Similarly, multiple in-person meetings may be weighted higher than multiple chat messages, etc. Interaction type processor 180 thus generates a weight metric based upon the types of interactions.

Action processor 182 generates a weight metric based on actions taken by the users. For instance, receiving an email message from a user may be weighted lower than replying to that email message. Accepting a meeting request may be weighted higher than receiving a meeting request, etc. There may be a wide variety of other processors 186 that generate other weight metrics based on other criteria as well.

Weight output system 184 receives the metrics generated by processors 176, 178, 180, 182, and 186 and generates a weight output indicative of a weight corresponding to a relationship between two users or between a user and a resource. Based upon the weighted relationships (or weighted graph edges) between users and between users and resources, batch generator system 160 clusters users and resources together and may identify the clusters as batches or may perform further processing to generate batches based on the clusters. Batch generator system 160 then generates an output indicative of the batches. Also, batch generation system 160 may receive inputs from administrator 126 that may guide the generation of batches. For instance, administrator 126 may provide inputs indicating that batches are to be generated based on user location (e.g., users in the same location should be preferentially batched together) as well as user interactions. Administrator 126 may also provide inputs indicating the desired maximum and minimum batch sizes, among other things. Batch generation system 160 then generates the batches based upon those administrator inputs and the weighted relationships or edges generated by edge weight generator 158. UI generator 164 generates a user interface representation of the suggested batches so that the user interface representation can be displayed for administrator 126. Administrator 126 is provided with actuators that allow administrator 126 to move users from one batch to another, to accept the batches or users, to delete batches, to change batch sizes, etc.

Batch generation system 160 can use any of a wide variety of different types of methods or algorithms to generate the batches. Batch generation system 160 basically receives or generates a graph of nodes representing users and resources, and weighted edges representing a weighted relationship between the different nodes. The nodes are then clustered together in clusters based on the edge weights and any inputs by administrator 126.

One way of clustering the nodes includes using one or more community detection algorithms. The community detection algorithms work on user-to-user relationship graphs (and user-to-resource relationship graphs) and tend to group more densely connected users and resources together, versus users and resources in other groups. The clustering algorithms can include, for instance, the Louvain community detection algorithm. The Louvain algorithm operates by iteratively optimizing a modularity function to find the partition of nodes that maximizes the networks community structure, resulting in a hierarchical representation of communities (or batches).

Another clustering algorithm includes the Leiden community detection algorithm which is a refinement of the Louvain algorithm, and is designed to enhance its stability and accuracy. Leiden achieves this by introducing a smart local move optimization strategy that reduces the algorithms sensitivity to initialization, which results in more reliable community (or batch) detection in large networks or graphs.

Yet another algorithm for generating batches is referred to as the Walktrap community detection algorithm which works by simulating random walks on the graph and measuring the similarity between walk patterns to uncover densely connected groups, revealing the underlying community or batch structure.

Another method for identifying batches can be performed by clustering on graph vector space (or graph embeddings). In one example, embeddings of each of the nodes in the graph are first generated. For instance, an embedding model may be used to map each node in the graph to its own 128-dimension vector. Once the nodes in the graph are reduced to feature vectors, a clustering algorithm or other clustering approach is applied to cluster the nodes in vector space.

One example of a clustering algorithm is referred to as a density-based spatial clustering of applications with noise (DBSCAN). The DBSCAN clustering algorithm groups data points based upon their proximity in a way that identifies dense clusters while identifying outliers as noise. The clusters are defined as regions of high data point density separated by areas of lower density.

Another clustering algorithm that can be run on the feature vectors is referred to as spectral clustering. Spectral clustering is a graph-based clustering algorithm that leverages the Eigenvalues and Eigenvectors of a similarity or affinity matrix to partition data into clusters. The spectral clustering method transforms the data into a lower-dimensional space using these Eigenvectors and then applies a traditional clustering algorithm, such as k-means, to group the data points into clusters (or batches) in this reduced space, effectively capturing complex structural patterns in the data.

Once the batches are generated, batch validation system 161 can be used to validate the batches. In one example, batch validation system 161 surfaces the batches, as suggested batches, to administrator 126 for manual validation. In another example, batch validation system 161 can automatically compare the batches to an organization structure to determine how accurately the batches align members in an organization with their manager. Similarly, the batch validation system 161 can determine how well users that worked closely together (e.g., developers and product owners) were grouped together in the same batches. Other ways of validating the suggested batches can be used as well.

Figure 3:
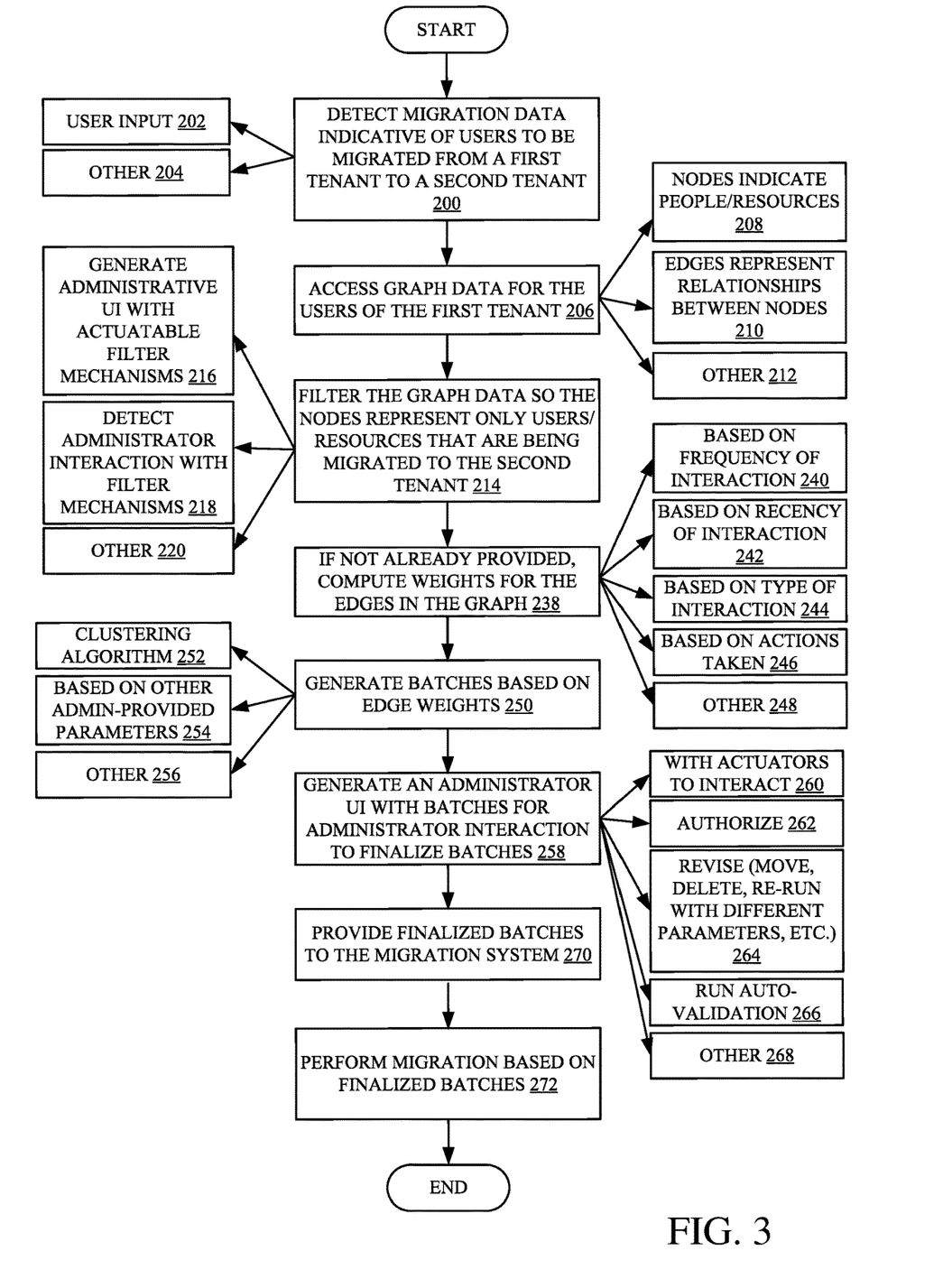
FIG. 3 is a flow diagram illustrating one example of the operation of the computing system architecture shown in FIG. 1 and the batching system shown in FIG. 2, in more detail.

FIG. 3 is a flow diagram illustrating one example of the operation of system architecture 100 and batching system 134 in migrating users 104-106 from tenant computing system 102 to tenant computing system 108, in batches. It is first assumed that batching system 134 detects migration data indicative of which users (104-106) are to be migrated from tenant computing system 102 to tenant computing system 108. Detecting this type of migration data is indicated by block 200 in the flow diagram of FIG. 3. The migration data can be input as a user input 202 or in other ways 204. Data extraction system 170 in graph data store interaction system 156 then access the graph data or interaction data in data store 136, as indicated by block 206 in the flow diagram of FIG. 3. As discussed above, in one example, the nodes in the graph represent people and resources as indicated by block 208 and relationships between those nodes are represented by edges in the graph, as indicated by block 210. The graph data can take other forms and be accessed in other ways as well, as indicated by block 212.

In one example, UI generator 164 can generate a user interface for administrator 126 with actuatable filter mechanisms that allow administrator 126 to set filters that can be applied to the graph data in user graph data store 136 so that data extraction system 120 extracts the correct data (those users and resources that are to be migrated). Filtering the graph data is indicated by block 214 in the flow diagram of FIG. 3. Generating an administrative user interface with actuatable filter mechanisms is indicated by block 216 in the flow diagram of FIG. 3. Interaction detector 166 then detects administrator interactions with those filter mechanisms, to set the filters, as indicated by block 218. Filtering the graph data can be done in other ways as well, as indicated by block 220.

Figure 4A:
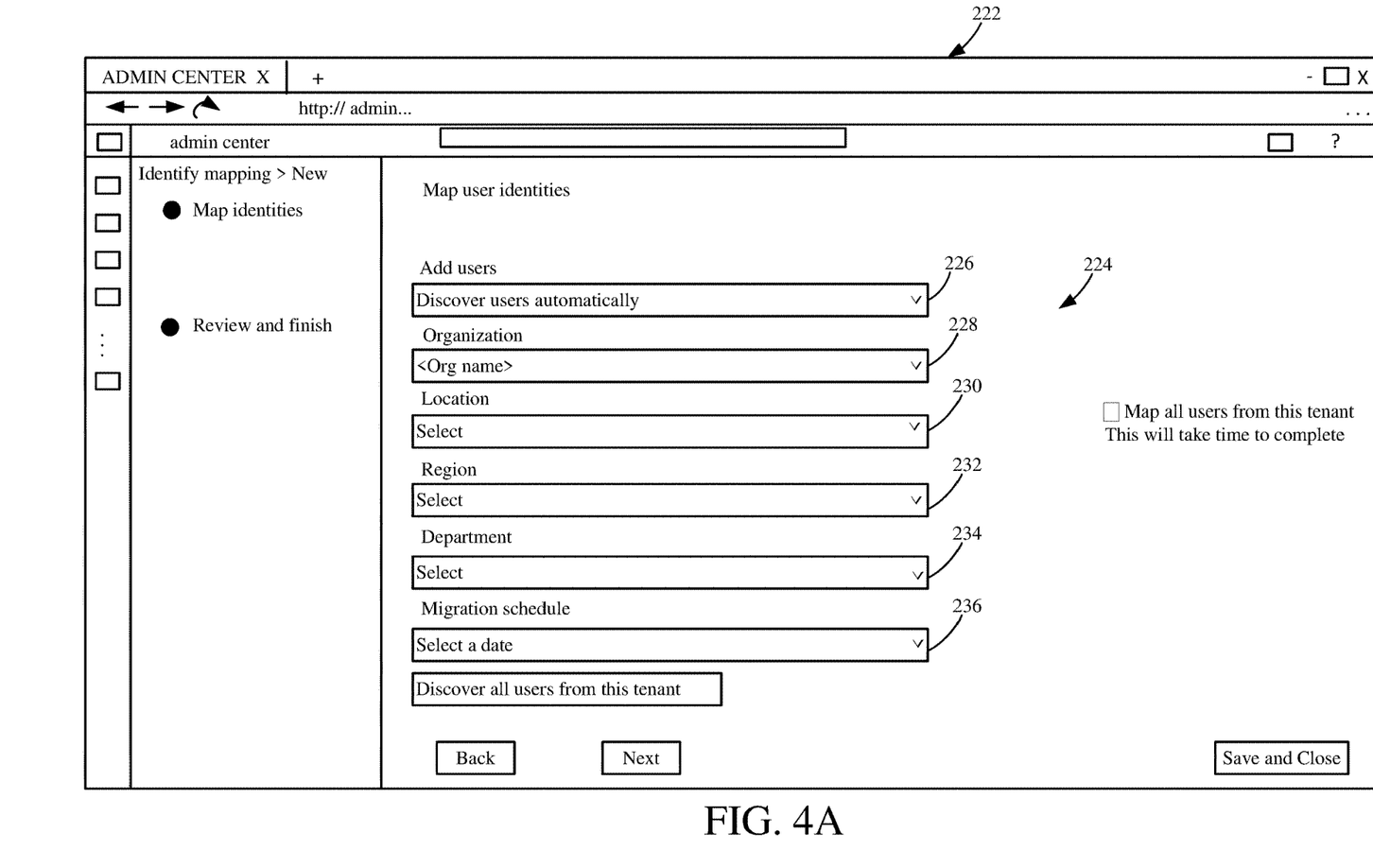
FIGS. 4A, and 4B show examples of user interfaces that can be generated for an administrator or another user.

FIG. 4A shows one example of a user interface display 222 that can be generated to allow administrator 126 to set filters to identify which users and resources are to be migrated. User interface display 222 includes a set of actuatable user input mechanisms 224 that allow administrator 126 to make selections and set filters to identify the user identities that need to be migrated. Mechanism 226 allows administrator 126 to indicate that the users are to be automatically discovered. Organization actuator 228 allows administrator 126 to specify an organization where the users are to be found. The location and region actuators 230, 232 allow administrator 126 to specify a geographic location and region corresponding to the users. A department actuator 234 allows administrator 126 to specify one or more departments from which users will be migrated. The input from actuators 228, 230, 232, and 234 can define filter criteria that are used to filter the data retrieved from user graph data store 136. User interface display 222 also includes a scheduling actuator 236 that allows the administrator 126 to specify the migration schedule. The extracted data is then the data that is to be divided into groups or batches for migration.

Filtering system 172 applies filters to the graph data so that the nodes represent only users and resources that are being migrated from tenant computing system 102 to tenant computing system 108.

If the weights on the edges of the graph data (that is now extracted and filtered) have not already been computed, then edge weight generator 158 generates the weights for those edges, as indicated by block 238 in the flow diagram of FIG. 3. Frequency processor 176 can generate a metric based upon the frequency of interactions as indicated by block 240. Recency processor 178 can generate a metric based on the recency of the interactions as indicated by block 242. Interaction type processor 180 can generate a metric indicative of the type of interaction as indicated by block 244. Action processor 182 can generate a metric based on actions performed in the interactions, as indicated by block 246, and other processors 186 can generate any of a wide variety of other metrics, as indicated by block 248 in the flow diagram of FIG. 3.

Batch generation system 160 then generates batches based on the filtered and weighted data, as indicated by block 250 in the flow diagram of FIG. 3. As discussed above, batch generation system 160 can employ a wide variety of other grouping or clustering algorithms 252. The batching can also be based on other administrator-provided parameters as indicated by block 254. Such parameters can include such things as desired batch size, batch by location, batch by organization, batch by user seniority, etc. For instance, if administrator 126 deemed that the users should be batched based upon the location where the users operate, then users at each location can be preferentially batched together based upon the weighted relationships. The batches can be generated in a wide variety other ways as well, as indicated by block 256.

Once the batches are generated, the batches can be used for migration or, in the example shown in FIG. 3, UI generator 164 can generate an administrator user interface illustrating the batches for administrator interaction in order to obtain a set of finalized batches. Generating the administrator user interface for administrator interaction is indicated by block 258 in the flow diagram of FIG. 3. The user interface can have actuators to interact with the displayed elements, as indicated by block 260. The actuators can include an actuator to authorize or accept the proposed batches, as indicated by block 262 or to revise the batches by moving users between batches, deleting users or batches, re-running the batching algorithm with different parameters, etc., as indicated by block 264. In addition, a user actuatable input mechanism can be used to initiate automated batch validation using batch validation system 161, as indicated by block 266. The user interface can be generated with other mechanisms or in other ways as well, as indicated by block 268.

The finalized batches can then be provided to the migration system 132 so that the users are migrated according to the batches and according to the migration schedule. Providing the finalized batches to the migration system is indicated by block 270 in the flow diagram of FIG. 3. Performing migration based upon the finalized batches is indicated by block 272 in the flow diagram of FIG. 3.

Figure 4B:
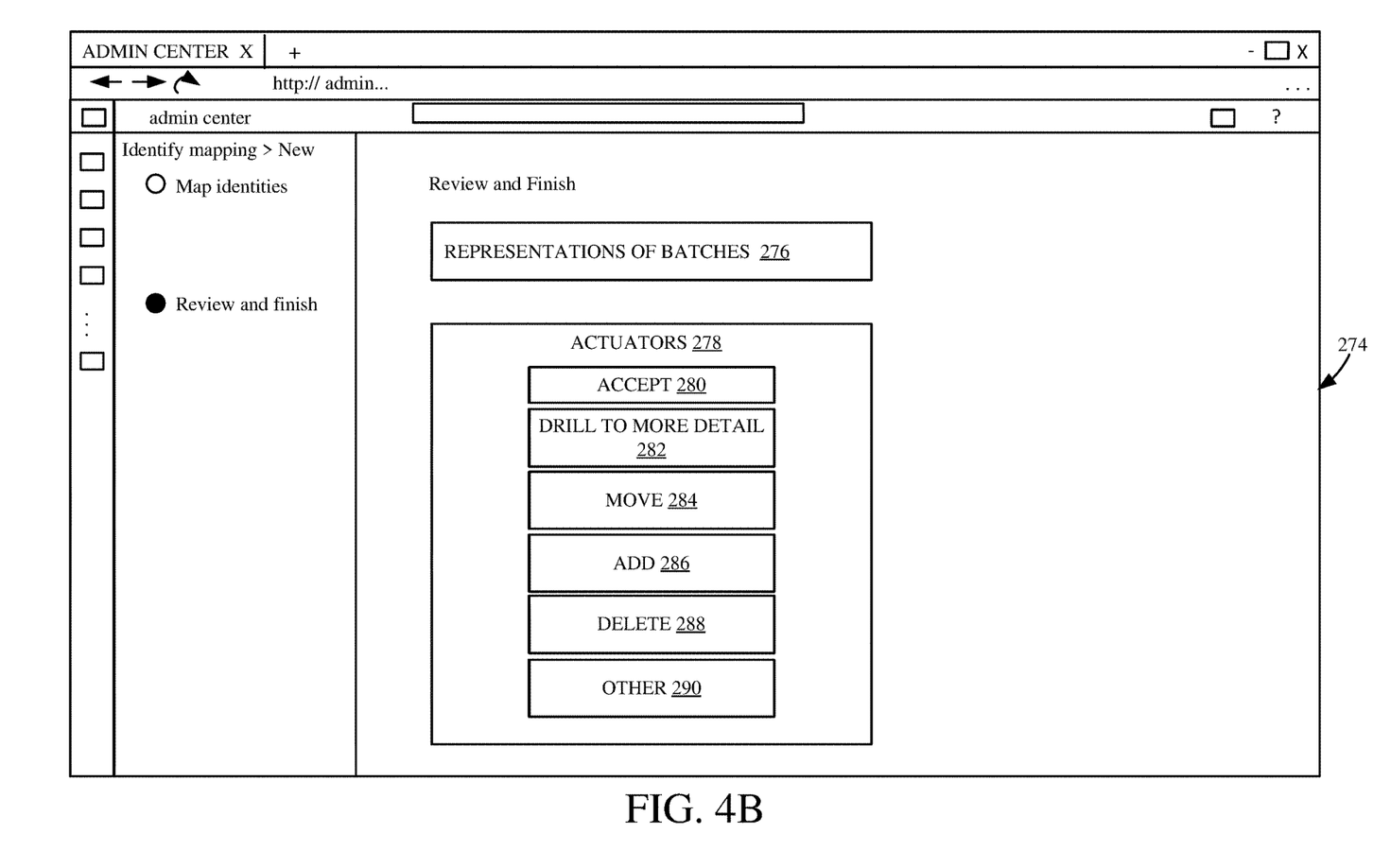

FIG. 4B is an illustration of another user interface display 274. User interface display 274 includes a set of representations of the proposed batches 276. The representations can be graphical elements, such as tables, icons, or other representations of the batches. In one example, the display 274 also includes a set of actuators 278 that allow administrator 126 to interact with the proposed batches represented by representations 276. The actuators 278 can, for instance, include an accept actuator 280. Actuators 278 can also, in one example, include drill actuators 282 that can be actuated by administrator 126 to see more detail about the representations of the proposed batches 276. For instance, by actuating one of the actuators 282, a selected batch may be expanded so that administrator 126 can view the members of the batch, and additional information, such as information that can be used to validate the batch (e.g., a comparison of the batch against an organization chart to ensure that all of the members in the batch are related in a desired way, given the organization chart. Actuators 278 can include move actuators 284 that allow administrator 126 to move users between different batches. For instance, actuators 284 may include a drag and drop actuator that allows administrator 126 to drag users from one batch to another. Actuators 278 may include an add actuator 286 that allows administrator 126 to add a batch, to add users or resources to a batch, or to make other additions. Actuators 278 may also include a delete actuator 288 that allows administrator 126 to delete batches, delete users from a batch, delete resources, or make other deletions. Actuators 278 can also include a wide variety of other actuators 290 that allow administrator 126 to modify the batches in other ways as well.

It can thus be seen that the present description describes a system that greatly enhances the efficiency and accuracy of migration operations. Automatically identifying user entities and creating batches ensures that none of the user entities or resources that are supposed to be migrated are left behind (or not migrated). Similarly, by identifying and weighting relationships between the users who are to be migrated and between the users and resources that are to be migrated, batches can be generated in a way that helps to ensure that sensitive data is not exposed to unauthorized users during migration. Further computing resources can be allocated more efficiently. By knowing batch sizes and the schedule of batches to be migrated, and by accurately knowing which users are to be migrated, resources can be deployed to migrate batches of critical users and resources prior to consuming resources on non-essential accounts and resources.

Also, the user experience is greatly enhanced and bandwidth requirements are reduced. Instead of having a large number of migrated users that need to maintain and access their identities in the old tenant, because batches are created based on user interactions with other users and resources, the system helps to ensure that users will be migrated with other users that they work with so as to avoid the need to maintain identities in the old tenant. Also, because users do not need to maintain and access two identities in two different tenant systems, the computing bandwidth needed for a given user to have access to his or her related users and resources is reduced because the users are only accessing one tenant.

It will be noted that the above discussion has described a variety of different systems, components, generators, detectors, and/or logic. It will be appreciated that such systems, components, generators, detectors, and/or logic can be comprised of hardware items (such as processors and associated memory, or other processing components, some of which are described below) that perform the functions associated with those systems, components, generators, detectors, and/or logic. In addition, the systems, components, generators, detectors, and/or logic can be comprised of software that is loaded into a memory and is subsequently executed by a processor or server, or other computing component, as described below. The systems, components, generators, detectors, and/or logic can also be comprised of different combinations of hardware, software, firmware, etc., some examples of which are described below. These are only some examples of different structures that can be used to form the systems, components, generators, detectors, and/or logic described above. Other structures can be used as well.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, they can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
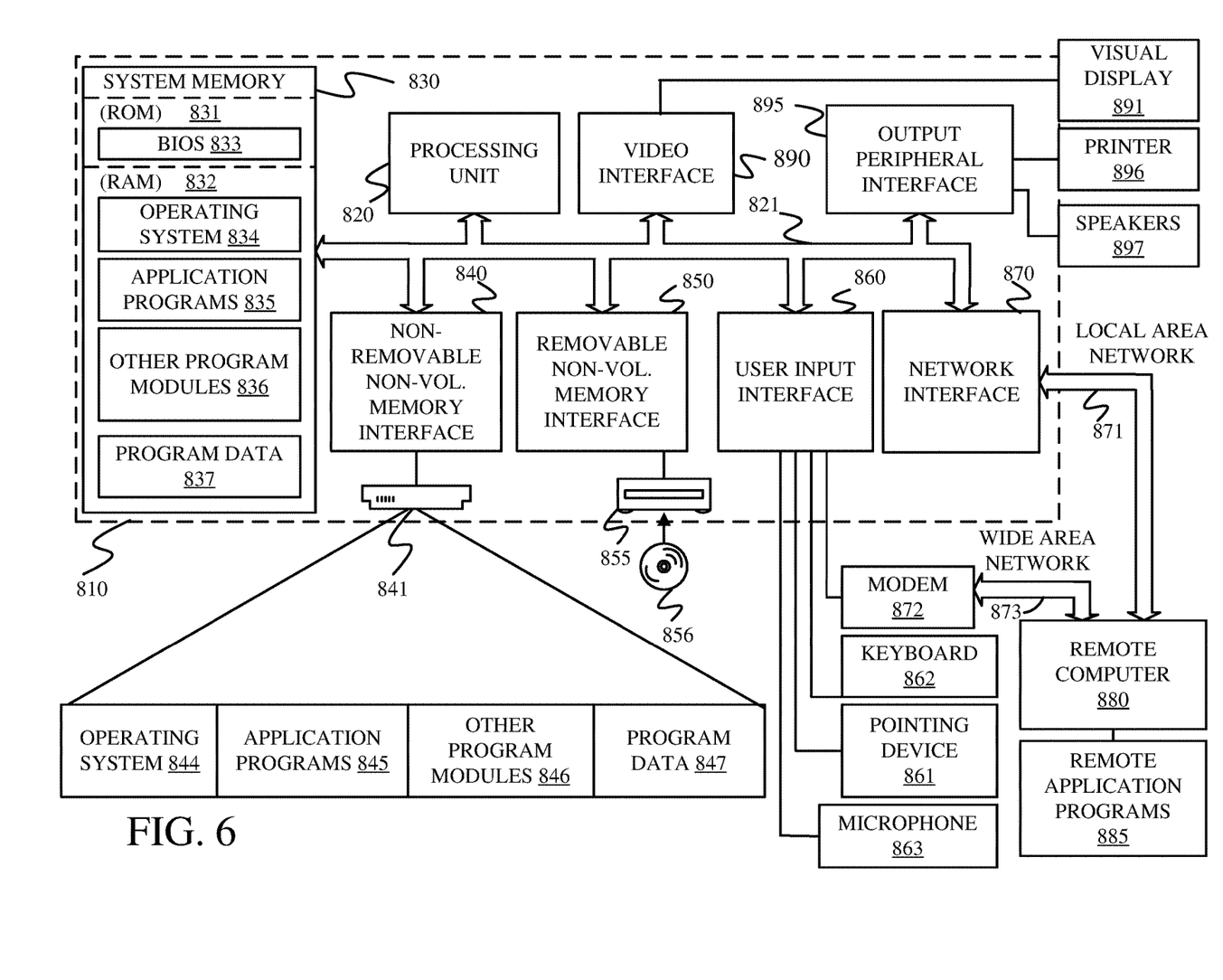
FIG. 6 is a block diagram showing one example of a computing environment that can be used in the systems and architectures shown in previous figures.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a conventional server, or the components and functions can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

Figure 5:
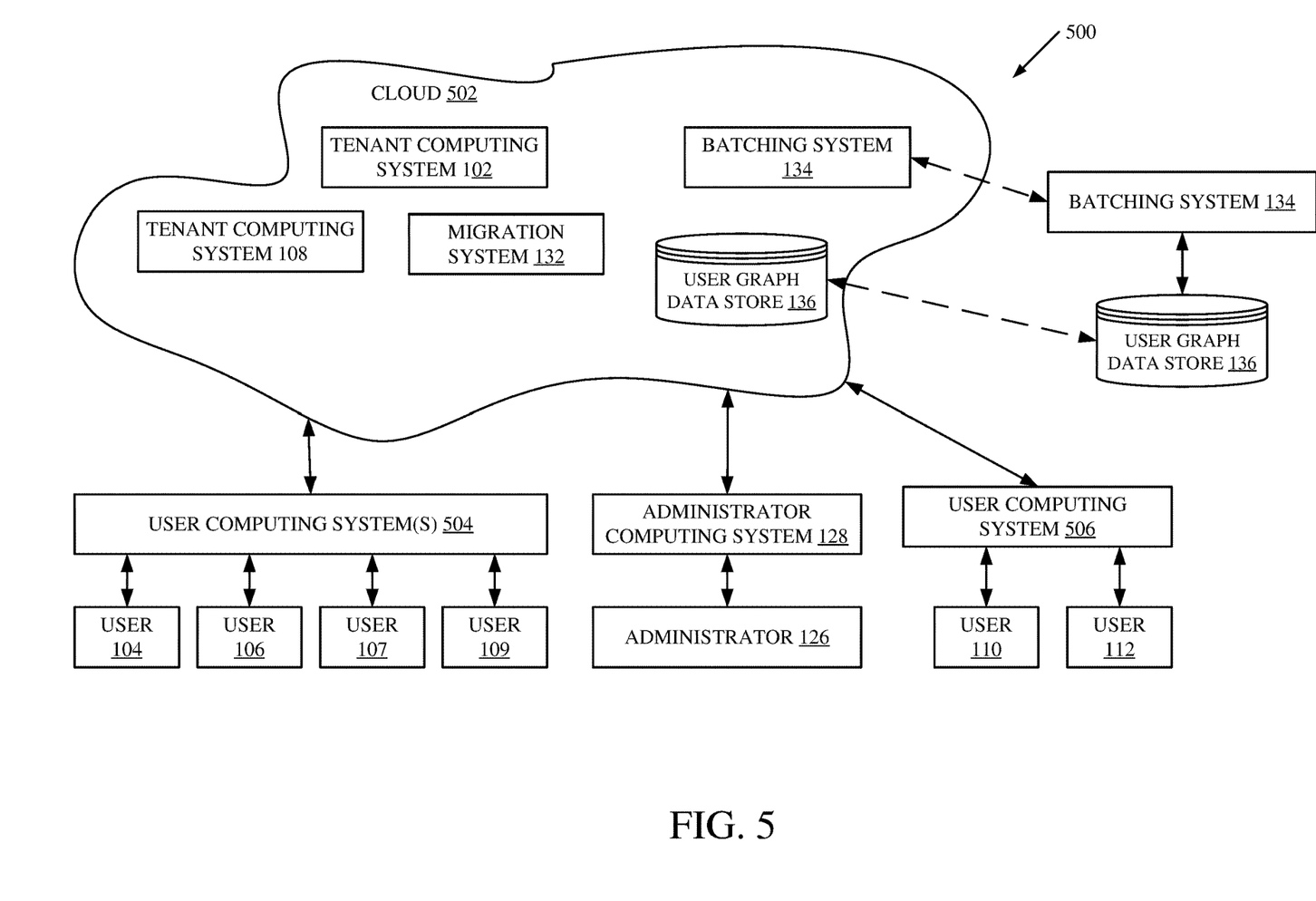
FIG. 5 is a block diagram showing one example of the computing system architecture shown in FIG. 1 deployed in a remote server architecture.

In the example shown in FIG. 5, some items are similar to those shown in FIG. 1 and they are similarly numbered. FIG. 5 specifically shows that systems 102, 108, 132, 134, and data store 136 can be located in cloud 502 (which can be public, private, or a combination where portions are public while others are private). Therefore, users 104-112 use user computing systems 504-506 to access those systems through cloud 502.

FIG. 5 also depicts another example of a cloud architecture. FIG. 5 shows that it is also contemplated that some elements of architecture 100 can be disposed in cloud 502 while others are not. By way of example, data store 136 can be disposed outside of cloud 502, and accessed through cloud 502. In another example, batching system 134 (or other items) can be outside of cloud 502. Regardless of where they are located, they can be accessed directly by systems 128, 504, and 506 through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

FIG. 6 is one example of a computing environment in which architecture 100, or parts of it, (for example) can be deployed. With reference to FIG. 6, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are examples and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer implemented method, comprising:
    accessing graph data representative of a graph having nodes representing a set of user identities for users of a first tenant computing system that are to be migrated to a second tenant computing system, the graph data being representative of edges representing relationships between pairs of users in the set of users of the first tenant computing system;
    obtaining a set of weights indicative of strengths corresponding to the edges;
    clustering the users in the set of users, into clusters, based on the set of weights;
    generating batches of users based on the clusters; and
    performing a migration operation to migrate the users in the set of users from the first tenant computing system to the second tenant computing system based on the batches.

Example 2 is the computer implemented method of any or all previous examples wherein accessing graph data comprises:
    generating a representation of a user interface with filter actuators that are actuated to filter the graph data; and
    detecting user interaction with the filter actuators.

Example 3 is the computer implemented method of any or all previous examples wherein accessing graph data comprises:
    applying filters to the graph data based on the detected user interaction with the filter actuators to obtain filtered graph data.

Example 4 is the computer implemented method of any or all previous examples wherein the graph data is further representative of the graph having nodes representative of shared resources in the first tenant computing system and edges representing user interactions with the shared resources.

Example 5 is the computer implemented method of any or all previous examples and further comprising:
    clustering the shared resources based on weights corresponding to the edges representing user interactions with the shared resources.

Example 6 is the computer implemented method of any or all previous examples and further comprising:
    generating batches of shared resources based on the clusters.

Example 7 is the computer implemented method of any or all previous examples wherein performing a migration operation comprises:
    performing a migration operation to migrate the shared resources from the first tenant computing system to the second tenant computing system based on the batches.

Example 8 is the computer implemented method of any or all previous examples wherein the edges represent interactions between the pairs of users in the set of users and wherein obtaining a set of weights comprises:
    identifying frequency data indicative of a frequency of the interactions between the pairs of users;
    identifying recency data indicative of a recency of the interactions between the pairs of users;
    identifying type data indicative of a type of the interactions between the pairs of users;
    identifying action data indicative of actions taken based on the interactions between the pairs of users; and
    generating the weights based on the frequency data, the recency data, the type data, and the action data.

Example 9 is the computer implemented method of any or all previous examples and further comprising:

generating a user interface with a representation of the batches and actuatable input mechanisms that are actuated to interact with the batches.

Example 10 is the computer implemented method of any or all previous examples and further comprising:
detecting actuation of the actuatable input mechanisms; and
modifying the batches based on the detected actuations.

Example 11 is the computer implemented method of any or all previous examples wherein the actuatable input mechanisms comprise:
a move actuator that is actuated to move a user between the batches;
an add/delete actuator that is actuated to add or delete a person from a batch;
a drill actuator that is actuated to display additional detail about the batches; and
an accept actuator that is actuated to finalize the batches.

Example 12 is a computer system, comprising:
at least one processor;
a memory storing computer executable instructions which, when executed by the at least one processor, cause the at least one processor to perform steps, comprising:
accessing graph data representative of a graph having nodes, each node representing a user identity for a user, of a first tenant computing system, that is to be migrated to a second tenant computing system, the graph data being representative of edges between the nodes, the edges representing relationships between pairs of users represented by the nodes, each edge having a corresponding weight indicative of a strength of the relationship represented by the corresponding edge;
generating batches of users based on the set of weights; and
generating an interactive output indicative of the batches.

Example 13 is the computer system of any or all previous examples and further comprising:
a migration system configured to perform a migration operation to migrate the users from the first tenant computing system to the second tenant computing system based on the batches.

Example 14 is the computer system of any or all previous examples and further comprising:
a user interface generator configured to generate a representation of a user interface with filter actuators that are actuated to filter the graph data;
an interaction detector configured to detect user interaction with the filter actuators; and
a filtering system configured to apply filters to the graph data based on the detected user interaction with the filter actuators to obtain filtered graph data.

Example 15 is the computer system of any or all previous examples wherein accessing graph data further comprises:
accessing graph data representative of the graph having nodes representative of shared resources in the first tenant computing system and edges representing user interactions with the shared resources.

Example 16 is the computer system of any or all previous examples and further comprising:
generating batches to include the shared resources based on weights corresponding to the edges representing user interactions with the shared resources.

Example 17 is the computer system of any or all previous examples and further comprising:
a user interface generator configured to generate a user interface with a representation of the batches and actuatable input mechanisms that are actuated to interact with the batches, the actuatable input mechanisms including a move actuator that is actuated to move a user between the batches, an add/delete actuator that is actuated to add or delete a person from a batch, and a drill actuator that is actuated to display additional detail about the batches.

Example 18 is the computer system of any or all previous examples and further comprising:
an interaction detector configured to detect actuation of the actuatable input mechanisms and modify the batches based on the detected actuations.

Example 19 is a computer implemented method, comprising:
accessing relationship data indicative of relationships between pairs of users of a first tenant;
automatically generating migration batches of users based on the relationship data; and
generating an interactive output showing the batches.

Example 20 is the computer implemented method of any or all previous examples and further comprising:
migrating the users from the first tenant to a second tenant based on the batches.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
accessing graph data representative of a graph having nodes representing a set of resources to be migrated from a first tenant computing system to a second tenant computing system and a set of user identities for users of the first tenant computing system that are to be migrated to the second tenant computing system, the graph having edges representing relationships between the nodes of the graph of the first tenant computing system;
obtaining a set of weights indicative of strengths corresponding to the edges between the nodes of the graph;
clustering the nodes of the graph into clusters based on weighted relationships from the set of weights between the nodes representing the set of user identities and the set of resources;
generating migration batches from the clusters based on the weighted relationships within each of the clusters; and
migrating the users and the resources from the first tenant computing system to the second tenant computing system based on the migration batches.

2. The computer-implemented method of claim 1, wherein accessing the graph data comprises:
generating a user interface with user interface elements that filter the graph data; and
detecting a user interaction with the user interface elements.

3. The computer-implemented method of claim 2, wherein accessing the graph data comprises applying filters to the graph data based on the user interaction detected with the user interface elements to obtain filtered graph data.

4. The computer-implemented method of claim 1, wherein the set of resources represented by the nodes in the graph include shared resources used by multiple users in the first tenant computing system.

5. The computer-implemented method of claim 4, wherein clustering the nodes of the graph into the clusters based on the weighted relationships includes:
   clustering the nodes based on the weighted relationships between user pairs; and
   further clustering the nodes based on the weighted relationships between the user pairs and the shared resources.

6. The computer-implemented method of claim 5, wherein edges between the nodes representing users and the nodes representing shared resources are based on user interactions with the shared resources.

7. The computer-implemented method of claim 6, wherein migrating the users and the resources in a first migration batch from the first tenant computing system to the second tenant computing system.

8. The computer-implemented method of claim 1, wherein:
   one or more of the edges of the graph represent interactions between the users and the resources based on:
      identifying frequency data indicative of interaction frequency interactions between the users and the resources;
      identifying recency data indicative of interaction recency interactions between the users and the resources;
      identifying type data indicative of interaction type between the users and the resources; and
      identifying action data indicative of actions taken based on interactions between the users and the resources; and
   generating the set of weights is based on the frequency data, the recency data, the type data, and the action data between the users and the resources.

9. The computer-implemented method of claim 1, further comprising generating a user interface that includes the migration batches and user interface input elements to interact with the migration batches.

10. The computer-implemented method of claim 9, further comprising modifying the migration batches within the user interface based on detecting inputs to the user interface input elements associated with the migration batches.

11. The computer-implemented method of claim 10, wherein the user interface input elements associated with the migration batches include:
    a move user interface element to move a user between the migration batches;
    an add/delete user interface element to add or delete a person from a migration batch;
    a drill user interface element to display additional detail about the migration batches; and
    an accept user interface element to finalize the migration batches.

12. A computer system, comprising:
    at least one processor; and
    a memory storing computer executable instructions which, when executed by the at least one processor, cause the at least one processor to perform steps, comprising:
       accessing graph data representative of a graph having nodes representing a set of resources to be migrated from a first tenant computing system to a second tenant computing system and a set of user identities for users of the first tenant computing system that are to be migrated to the second tenant computing system, the graph having edges representing relationships between the nodes of the graph of the first tenant computing system;
       obtaining a set of weights indicative of strengths corresponding to the edges between the nodes of the graph;
       clustering the nodes of the graph into clusters based on weighted relationships from the set of weights between the nodes representing the set of user identities and the set of resources;
       generating migration batches from the clusters based on the weighted relationships within each of the clusters; and
       generating an interactive user interface that includes the migration batches.

13. The computer system of claim 12, further comprising migrating the users and the resources from the first tenant computing system to the second tenant computing system based on the migration batches.

14. The computer system of claim 12, further comprising:
    generating a user interface with user interface elements that filter the graph data;
    detecting a user interaction with the user interface elements; and
    filtering the graph data based on the user interaction detected with the user interface elements to obtain filtered graph data.

15. The computer system of claim 12, wherein the set of resources represented by the nodes in the graph include shared resources used by multiple users in the first tenant computing system.

16. The computer system of claim 15, wherein clustering the nodes of the graph into the clusters based on the weighted relationships includes:
    clustering the nodes based on the weighted relationships between user pairs; and
    further clustering the nodes based on the weighted relationships between the user pairs and the shared resources.

17. The computer system of claim 12, wherein the interactive user interface with the migration batches includes user interface elements for moving a user between the migration batches, adding or deleting a person from the migration batches, finalizing the migration batches.

18. The computer system of claim 17, further comprising modifying a migration batch based on detecting input to a batch modification user interface element.

19. A non-transitory computer-readable storage medium comprising instructions that, when executed by a processor, cause a computer device to carry out operations comprising:
    accessing graph data representative of a graph having nodes representing a set of resources to be migrated from a first tenant computing system to a second tenant computing system and a set of user identities for users of the first tenant computing system that are to be migrated to the second tenant computing system, the graph having edges representing relationships between the nodes of the graph of the first tenant computing system:
    obtaining a set of weights indicative of strengths corresponding to the edges between the nodes of the graph;
    clustering the nodes of the graph into clusters based on weighted relationships from the set of weights between the nodes representing the set of user identities and the set of resources;

generating migration batches from the clusters based on the weighted relationships within each of the clusters; and migrating a first migration batch of selected users and selected resources from the first tenant computing system to the second tenant computing system.

20. The non-transitory computer-readable storage medium of claim 19, wherein:
the set of resources represented by the nodes in the graph includes shared resources used by multiple users in the first tenant computing system; and
clustering the nodes of the graph into the clusters based on the weighted relationships includes:
clustering the nodes based on the weighted relationships between user pairs; and
further clustering the nodes based on the weighted relationships between the user pairs and the shared resources.

* * * * *